United States Patent Office 3,558,547
Patented Jan. 26, 1971

3,558,547
PIGMENTED ELASTOMER-BASED
COATING COMPOSITIONS
Max Kronstein, New York, N.Y., assignor to Research Corporation, New York, N.Y., a non-profit corporation of New York
No Drawing. Filed June 28, 1968, Ser. No. 740,980
Int. Cl. B32b 15/08; C08f 45/00
U.S. Cl. 260—31.2                                    7 Claims

ABSTRACT OF THE DISCLOSURE

Compositions comprising vulcanizable elastomeric resin, pigment, carbon black and sulfur mu dispersed in solvent cure at ambient temperatures to form mechanically strong and durable coatings.

---

This invention relates to coating composition. In one specific aspect, it relates to pigmented elastomer-based coating compositions.

It is well known to coat metal surfaces with an oil-based paint formulation having a pigment dispersed therein in order to protect the metal against corrosion. I have now discovered pigmented elastomer-based coating compositions of particular utility for this purpose.

It is, therefore, a principal object of the present invention to provide pigmented elastomer-based coating or paint compositions useful in protecting metal surfaces against the action of water and corrosion.

It is a further object of the invention to provide paint compositions high in elastomer content capable of curing at ambient temperatures to form a mechanically strong and durable coating.

These and other desirable objectives and advantages of the present invention will become apparent from the discussion and examples which follow:

The coating or paint compositions of the present invention are based on the discovery that the addition of sulfur mu to a coating composition containing a vulcanizable elastomeric resin permits the composition to cure on application at ambient temperatures to form a mechanically strong and durable protective coating.

As is well known, sulfur is available in a variety of physical forms. Sulfur mu designates the polymer form of sulfur generally prepared by heating sulfur at elevated temperatures and quenching the resultant vapors by passage into a body of liquid. Such polymerized sulfur is amorphous and has physical properties similar to those of organic thermoplastic elastomers.

Polymerized sulfur can be distinguished from flowers of sulfur and precipitated sulfur by its insolubility in carbon disulfide. More important, sulfur mu has a marked affinity for elastomers dispersed in a solvent vehicle not possessed by the other better known forms of sulfur. The desirable coatings obtained with the compositions of the present invention are attributed, at least in part, to the unique characteristics of sulfur mu.

Accordingly, the coating compositions of the present invention are 20–60% by weight solvent-dispersions of solids consisting essentially of 20–50 parts of vulcanizable elastomer resin, 10–30 parts of pigment, 5–15 parts of carbon black and 1–3 parts of sulfur mu.

As used herein, the term "elastomers" means polymeric materials possessing mechanical properties similar to those of natural rubber, i.e., high deformability, rapid recovery of deformation and good mechanical strength. Vulcanizable elastomers preferred for use in formulating the coating compositions of the present invention are rubber-like synthetic polymers such as polyisoprene, butadiene-acrylonitrile copolymer, styrene-butadiene copolymer, unsaturated polyamides, polyurethanes, polymeric epoxide of epichlorohydrin elastomers (U.S. Patents 3,026,270, 3,026,305 and 3,341,491), chlorosulfonated polyethylene, et cetera. Mixtures of such vulcanizable elastomers can be employed and/or the elastomers may be blended with other polymeric materials. For example, non-vulcanizable coating resins may be incorporated for their plasticizing or other desirable effects, e.g., tung oil reacted phenolic resin may be added to improve adhension of the coating to the metal substrate.

As used herein, the term "pigments" refers to fine-sized solid particles, dispersable in the vehicle and often serving as reinforcing fillers as well as imparting color to the coating. Conventional paint pigments such as the metal oxides, chromates, et cetera, may be used in preparing the compositions of the present invention. Pigments such as red lead oxide and zinc oxide or chromate, which exhibit anti-corrosion activity when applied to a metal surface, are preferred; zinc oxide is particularly preferred because it may enter into or promote the curing reaction. Carbon black is used in conjunction with the pigment in order to strengthen the ultimate coating and make it more resistant to cracking.

As used herein, the term "solvents" refers to volatile solvents such as hydrocarbons, ketones, esters or other solvent mixtures which serve as dispersing agents for the elastomeric resin or resins, pigment, carbon black and sulfur mu. The solvent should be capable of facile evaporation under ambient conditions and leave a minimum of residue. Generally speaking, the coating compositions of the present invention are formulated to contain a higher concentration of polymer material than the more conventional oil-based protective paints. Thus, a lesser number of coats need be applied, as by brushing or spraying, to obtain the desired final paint film thickness than would be required with conventional paints.

In order to increase its anti-corrosion capabilities and to increase its adhesion to the metal substrate, the present compositions can be applied to the metal previously coated with a primer system. A particularly effective system for use with the present composition is the application of a wash-primer followed by the application of a red lead or a zinc chromate vinyl primer. As is well known, a "wash-primer" is a dispersion of a vinyl resin, such as a vinyl butyral or vinyl formal resin in a suitable solvent mixture pigmented with basic zinc chromate, lead chromate or chromic phosphate (the dispersion is activated before use by means of phosphoric acid). A "vinyl primer" is a dispersion of a vinyl chloride-vinyl acetate copolymer in a suitable solvent containing a plasticizer, such as a tricresylphosphate, and pigmented with red lead oxide or zinc chromate and a pigment extender.

It is emphasized that a sulfur which is predominantly sulfur m$\mu$ must be used in preparing the compositions of the present invention. Comparative coatings made with precipitated sulfur failed relatively rapidly. Coatings made with flowers of sulfur, while superior to those made with precipitated sulfur, were far less resistant to exposure tests than those made with predominantly sulfur m$\mu$.

A Bausch and Lomb dypnotic polarizing microscope was employed to study the interaction of various forms of sulfur with solvent dispersions of a vulcanizable elastomer. Equal amounts of precipitated sulfur, flowers of sulfur and sulfur m$\mu$ were added to separate portions of a 5% dispersion of polyisoprene in benzene, and the solvent allowed to evaporate. Photographs taken with a camera attached to the microscope showed the precipitated sulfur essentially undispersed, the flowers of sulfur somewhat dispersed and the sulfur m$\mu$ nearly fully dispersed within the polyisoprene polymer film.

Sulfur mµ also promotes the dispersion of carbon black within the coating composition. For example, when 9 grams of carbon black is mixed with 100 grams of a 5% or a 25% solution of polyisoprene in benzene, the carbon black has a tendency to form easily visible conglomerates within the film obtained on evaporation of the solvent. However, when the carbon black is added to separate portions of the same polymer solutions after they have been mixed with sulfur mµ, a much improved dispersion of the carbon black is observed. Similar results are observed when the polyisoprene is blended with a polyamide.

The beneficial effects of sulfur mµ are markedly enhanced in the presence of a conventional vulcanization accelerator, e.g., aniline-type nitrogen compounds, nitrogen and sulfur compounds such as mercaptobenzothiazoles, disulfides, and so forth. Not only is the rate of vulcanization increased when accelerators are employed, but a stronger coating is obtained on curing. The presence of an accelerator further improves the ease with which the carbon black is dispersed in the compositions of the present invention.

In the experiments described below, the basic test formulation contained 15 grams of unsaturated polyamide resin of the type described in U.S. Patent 2,379,413, 10 grams of vulcanizable chlorosulfonated polyethylene, 22 grams of zinc oxide and 9 grams of carbon black. The test formulations were applied to tin-plated 30-31 gauge steel test panels; the dry thickness of the paint coating was about 1.43-1.69 mil. One coat of vinyl butyral-zinc chromate wash-primer dry thickness of 0.05-0.07 mil, was applied prior to painting.

The coated panels were subjected to the Gardner Impact Test with an impact flexibility tester. The test instrument consists of a cylindrical impactor having a weight of approximately three-fourths pound which is dropped through a guide tube from a height of 4 feet onto the test surface. The impactor has five protruding spherical knobs on one end and three on the other end, which permit studying the effect equivalent to a 0.5%, 1, 2, 5, 10, 20, 40 or 60% elongation in the impact area.

The stability of these coatings to underwater sonic pulsation was also studied. The test panels were attached to a stand about 2.75 inches from the energy source in a sonic pulsation tank (Powertron 3003). Four transducers operated and controlled by an ultrasonic generator having an average output power of 300 watts with a 1200 watt peak are located underneath the tank. The apparatus is stated to produce a cold boiling or cavitation effect with implosive forces of about 30,000 to 50,000 p.s.i. against test surfaces exposed to their effect.

The general method for formulation of the test paint was as follows: A mixture of 9 grams of carbon black (particle size 17 millimicrons), 22 grams of pigment zinc oxide and 50 grams of nitropropane were blended by ball milling. A 45 gram portion of a solution prepared by dissolving 50 grams of unsaturated polyamide resin (Versalon 1140) in 70 grams of benzene and 20 grams of isopropyl alcohol and 40 grams of a 30% solution of vulcanizable chlorosulfonated polyethylene (Hypalon 30) was added to the mixture and the ingredients blended by further ball milling. The sulfur and/or the sulfur-containing compound, if any, was added and the formulation finally blended by ball milling.

EXAMPLE 1

Using the general method described above, a composition was formulated without the addition of sulfur or a sulfur-containing compound. On application to the test panels, the paint dried smooth and hard. Several pinholes formed in the paint coating after 1 hour in the sonic pulsation test and several additional pinholes formed near the edges of the panel after 2 hours. Many pinholes and three areas where the metal was exposed were observed after 23 hours.

EXAMPLE 2

Using the general method described above, a coating was formulated according to the present invention containing 3 grams of sulfur mµ. On application to the test panels, the paint dried smooth and hard. No cracks formed in the Gardner Impact Test. A few scattered pinholes were observed after 1½ hours in the sonic pulsation test. No further pinhole formation was observed after 21 hours of additional testing.

EXAMPLE 3

The procedure of Example 1 was repeated using flowers of sulfur in place of sulfur mµ. On application to the test panels, the paint dried to a hard but rough surface. No cracks formed in the Gardner Impact Test. A few groups of pinholes were observed after 1 hour in the sonic pulsation tank. After 3 hours, many pinholes were observed; after 22 hours, three large areas of pinholes and exposure of the metal substrate were observed.

EXAMPLE 4

The procedure of Example 2 was repeated using precipitated sulfur in place of flowers of sulfur. On application to the test panels, the paint dried hard and smooth. No cracks were formed in the Gardner Impact Test. Several areas where the metal was exposed were observed after 2 hours of testing the sonic pulsation tank.

EXAMPLE 5

The procedure of Example 2 was repeated using 1.5 gram of sulfur mµ and 1.5 gram of benzothiazyldisulfide. On application to the test panels, the paint dried smooth and hard. No pinholes were observed in the sonic pulsation test after 24 and 48 hours of testing. A few pinholes near the center of the panel were observed after 72 hours; no further changes were observed at 96 hours or at 120 hours of testing.

EXAMPLE 6

The procedure of Example 5 was repeated using 1.5 gram of sublimed sulfur in place of sulfur mu. The paint dried to a smooth and hard finish; no cracks formed in the Gardner Impact Test. Exposed metal was observed in the center of the panel after 2 hours in the sonic pulsation tank.

EXAMPLE 7

The procedure of Example 5 was repeated omitting the sulfur mu and using 3 grams of benzothiazylsulfide in its place. The paint dried smooth and hard on the test panel and no cracks resulted in the Gardner Impact Test. Extensive pinhole formation across the middle of the test panel was observed after 1 hour of testing in the sonic pulsation tank.

The coating compositions of the present invention may be applied to metal surfaces having conventional primer coatings, such as the wash-primer of Specification MIL–P–15328B or the red lead vinyl primer of Specification MIL–P–15929B, without requiring a special primer. If a primary application of an elastomeric undercoat or intercoat is desired, the compositions of the invention can be applied in ta diluted form. As discussed above, the elastomeric coatings of the present invention cure to a desirable finish at ambient temperatures. However, curing can be accelerated by the application of heat as in an oven or by exposure to radiant heat.

Results similar to those of Examples 2 and 5 were obtained when the above-described pigment-carbon black dispersion and sulfur mu were blended with 75 grams of a 25% dispersion of polymeric epichlorohydrin (Hydrin 100) in methyl ethyl ketone and with 100 grams of a 25% dispersion of styrenebutadiene copolymer. Similar results were also obtained when the elastomer utilized was butadiene acrylonitrile copolymer or polyisoprene above or blended with chlorosulfonated polyethylene or a polyurethane which may contain available isocyanate. Similarly, (a) 17.5 grams of the rutile titanium dioxide and 5 grams of carbon black, (b) 15 grams of rutile, 2.5 grams of zinc oxide and 5 grams of carbon black, and (c) 15 grams of precipitated iron oxide and 5 grams of carbon black have been utilized as the pigment-carbon black mixture. The compositions of the present invention may also contain rigid polymer particles of size similar to that of the inorganic pigment, fungicides, stabilizers and other conventional paint additives. Other variations, falling within the scope of my invention, will suggest themselves to those skilled in the art and my invention is as claimed.

I claim:
1. A coating composition comprising a 20–60% by weight volatile solvent-dispersion of solids consisting essentially of 20–50 parts of sulfur vulcanizable elastomeric resin, 10–30 parts of pigment, 5–15 parts of carbon black and 1–3 parts of sulfur mu.
2. A coating composition according to claim 1 wherein the pigment is corrosion inhibiting.
3. A coating composition according to claim 1 containing a vulcanization accelerator.
4. A coating composition comprising 15 parts of an unsaturated polyamide resin, 10 parts of chlorosulfonated polyethylene, 22 parts of zinc oxide, 9 parts of carbon black, 3 parts of sulfur mu and 80 parts of volatile solvent.
5. A coating composition comprising 15 parts of an unsaturated polyamide resin, 10 parts of chlorosulfonated polyethylene, 22 parts of zinc oxide, 9 parts of carbon black, 1.5 parts of sulfur mu, 1.5 parts of benzothiazyldisulfide and 80 parts of volatile solvent.
6. A coating composition comprising 19 parts of polymeric epichlorohydrin, 22 parts of zinc oxide, 9 parts of carbon black, 3 parts of sulfur mu, and 58 parts of volatile solvent.
7. A coating composition comprising 25 parts of styrene-butadiene copolymer, 22 parts of zinc oxide, 9 parts of carbon black, 3 parts of sulfur mu, and 75 parts of volatile solvent.

References Cited
UNITED STATES PATENTS

| | | | |
|---|---|---|---|
| 2,667,406 | 1/1954 | Morningstar | 23—224 |
| 2,947,614 | 8/1960 | Manthey | 23—224 |
| 3,427,292 | 2/1969 | Godfrey et al. | 260—79.5 |

OTHER REFERENCES

Hofmann: "Vulcanization and Vulcanizing Agents," (Palmerton), (N.Y.), (1967—in English, translated from the German edition of 1965), pp. 74–75.

MORRIS LIEBMAN, Primary Examiner

H. H. FLETCHER, Assistant Examiner

U.S. Cl. X.R.

23—224; 117—132, 133; 260—32.8, 33.6, 37, 41, 41.5